United States Patent
Mazloum et al.

(10) Patent No.: US 11,240,849 B2
(45) Date of Patent: Feb. 1, 2022

(54) EARLY DATA TRANSMISSION IN A RANDOM ACCESS PROCEDURE

(71) Applicant: Sony Corporation, Tokyo (JP)

(72) Inventors: Nafiseh Mazloum, Lund (SE); Basuki Priyanto, Lund (SE); Peter C. Karlsson, Lund (SE); Rickard Ljung, Helsingborg (SE); Anders Berggren, Lund (SE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/766,103

(22) PCT Filed: Nov. 26, 2018

(86) PCT No.: PCT/EP2018/082574
§ 371 (c)(1),
(2) Date: May 21, 2020

(87) PCT Pub. No.: WO2019/102001
PCT Pub. Date: May 31, 2019

(65) Prior Publication Data
US 2020/0367290 A1    Nov. 19, 2020

(30) Foreign Application Priority Data
Nov. 24, 2017   (SE) .................................. 1730327-2

(51) Int. Cl.
*H04W 74/08* (2009.01)
*H04L 12/841* (2013.01)
(Continued)

(52) U.S. Cl.
CPC ....... *H04W 74/0833* (2013.01); *H04L 47/283* (2013.01); *H04W 72/1278* (2013.01);
(Continued)

(58) Field of Classification Search
CPC ......... H04W 74/0833; H04W 47/1278; H04W 74/04; H04W 74/006; H04W 80/04;
(Continued)

(56) References Cited

U.S. PATENT DOCUMENTS

2007/0230600 A1    10/2007   Bertrand
2010/0093386 A1*    4/2010   Damnjanovic ..... H04W 74/002
                                                        455/522
(Continued)

FOREIGN PATENT DOCUMENTS

WO    WO-2012131654 A1 * 10/2012    .......... H04W 74/002

OTHER PUBLICATIONS

Swedish Search Report from corresponding Swedish Patent Application No. 1730327-2, dated Jun. 7, 2018, 3 pages.
(Continued)

*Primary Examiner* — Wutchung Chu
(74) *Attorney, Agent, or Firm* — Tucker Ellis LLP

(57) ABSTRACT

A method comprises communicating, between a terminal (102) and a base station (101), an uplink control message (6001, 6003) of a random access procedure, the uplink control message (6001, 6003) comprising an indicator indicative of uplink payload data (6005, 6007) queued for transmission during the random access procedure. The method also comprises configuring the random access procedure depending on the indicator and communicating, in the random access procedure configured in accordance with the indicator, the uplink payload data (6005, 6007).

19 Claims, 11 Drawing Sheets

(51) Int. Cl.
*H04W 72/12* (2009.01)
*H04W 74/00* (2009.01)
*H04W 80/04* (2009.01)

(52) U.S. Cl.
CPC ....... *H04W 74/004* (2013.01); *H04W 74/006* (2013.01); *H04W 80/04* (2013.01)

(58) Field of Classification Search
CPC ............. H04W 72/1284; H04W 74/08; H04W 74/004; H04W 28/0278; H04W 76/27; H04W 28/16; H04W 72/1257; H04W 36/06; H04W 72/02; H04W 24/10; H04W 76/14; H04W 76/023; H04W 74/008; H04W 72/042; H04W 4/70; H04W 74/002; H04W 36/30; H04W 36/0055; H04W 72/14; H04W 52/365; H04W 72/0413; H04W 24/02; H04W 72/1242; H04W 56/0045; H04W 52/325; H04W 72/1268; H04L 47/283; H04L 1/1848; H04L 69/321; H04L 69/324; H04L 5/0094; H04L 1/1607; H04B 7/0695
See application file for complete search history.

(56) References Cited

U.S. PATENT DOCUMENTS

| | | | |
|---|---|---|---|
| 2012/0172063 A1 | 7/2012 | Lee | |
| 2013/0215848 A1* | 8/2013 | Kato | H04W 72/042 370/329 |
| 2014/0079011 A1* | 3/2014 | Wiberg | H04W 74/006 370/329 |
| 2015/0173105 A1* | 6/2015 | Bergstrom | H04W 74/006 370/329 |
| 2015/0341937 A1 | 11/2015 | Speight | |
| 2016/0234865 A1* | 8/2016 | Yasukawa | H04W 4/70 |
| 2016/0286580 A1* | 9/2016 | Liu | H04W 74/0833 |
| 2017/0013643 A1* | 1/2017 | Nan | H04W 74/0833 |
| 2017/0078907 A1* | 3/2017 | Wu | H04L 5/0048 |
| 2017/0265243 A1* | 9/2017 | Hahn | H04W 76/19 |
| 2017/0366999 A1* | 12/2017 | Tsuboi | H04W 72/085 |
| 2017/0374686 A1* | 12/2017 | Agarwal | H04W 74/0833 |
| 2018/0049244 A1* | 2/2018 | Lee | H04W 76/27 |
| 2018/0139778 A1* | 5/2018 | Chou | H04W 74/04 |
| 2018/0139785 A1* | 5/2018 | Zhang | H04W 72/0413 |
| 2018/0146410 A1* | 5/2018 | Cho | H04W 36/0061 |
| 2018/0176947 A1* | 6/2018 | Yu | H04W 74/0858 |
| 2018/0249509 A1* | 8/2018 | Yi | H04W 48/16 |
| 2018/0324854 A1* | 11/2018 | Phuyal | H04W 74/085 |
| 2018/0324869 A1* | 11/2018 | Phuyal | H04W 72/14 |
| 2019/0028923 A1* | 1/2019 | Futaki | H04W 74/0833 |
| 2019/0045554 A1* | 2/2019 | Ye | H04L 5/001 |
| 2019/0104551 A1* | 4/2019 | Deenoo | H04W 72/0446 |
| 2019/0159257 A1* | 5/2019 | Rico Alvarino | H04W 74/0833 |
| 2019/0207734 A1* | 7/2019 | Yang | H04L 1/1864 |
| 2019/0215872 A1* | 7/2019 | Park | H04W 52/0216 |
| 2019/0306887 A1* | 10/2019 | Rathonyi | H04L 5/0012 |
| 2020/0059390 A1* | 2/2020 | Zhang | H04L 1/0004 |
| 2020/0229235 A1* | 7/2020 | Lu | H04W 74/08 |
| 2020/0245362 A1* | 7/2020 | Hoglund | H04W 72/14 |
| 2020/0267775 A1* | 8/2020 | Wang | H04W 74/002 |
| 2021/0112590 A1* | 4/2021 | Kim | H04W 74/008 |

OTHER PUBLICATIONS

International Search Report from corresponding International Application No. PCT/EP2018/082574, dated Jan. 31, 2019, 11 pages.
Zou, Wei et al., "Small data transmission at the detached machine-type-communication device", 23rd Annual IEEE International Symposium on Personal, Indoor and Mobile Radio Communications, Sydney, Australia, dated Sep. 9, 2012, pp. 13-17.
Ericsson, "Early data transmission for fe-NB-IoT UEs", 3GPP TSG-RAN WG2 #99, R2-1708629, Aug. 20, 2017, 10 pages.
Intel Corporation, "Running CR for Early Data Transmission", 3GPP TSG RAN WG2 Meeting #100, R2-1712636, Nov. 17, 2017, 14 pages.
Ericsson, "[99bis#53] [MTC/NB-IoT] EDT indication via PRACH", 3GPP TSG-RAN WG2 #100, R2-1713057, Nov. 17, 2017, 30 pages.

\* cited by examiner

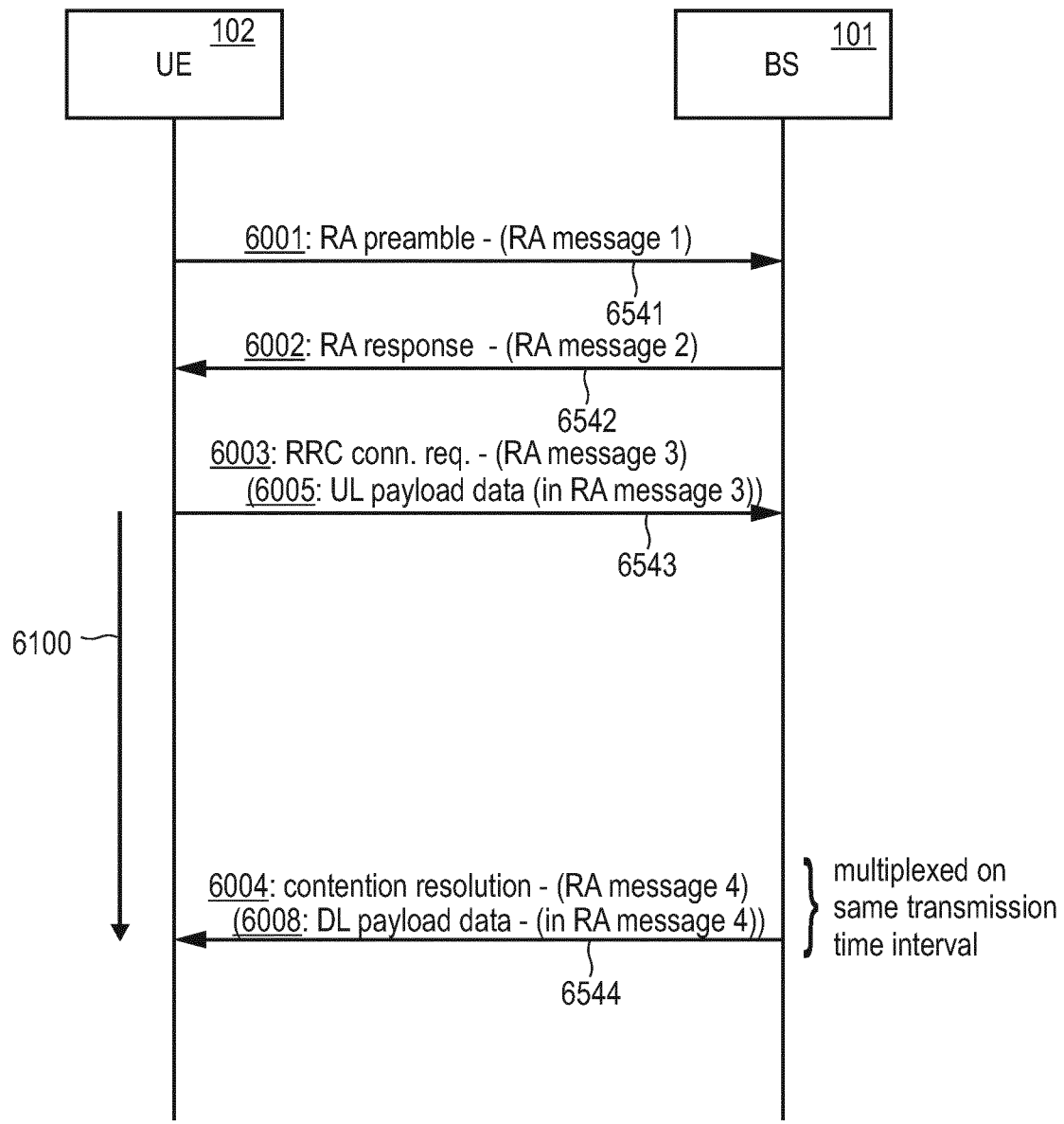

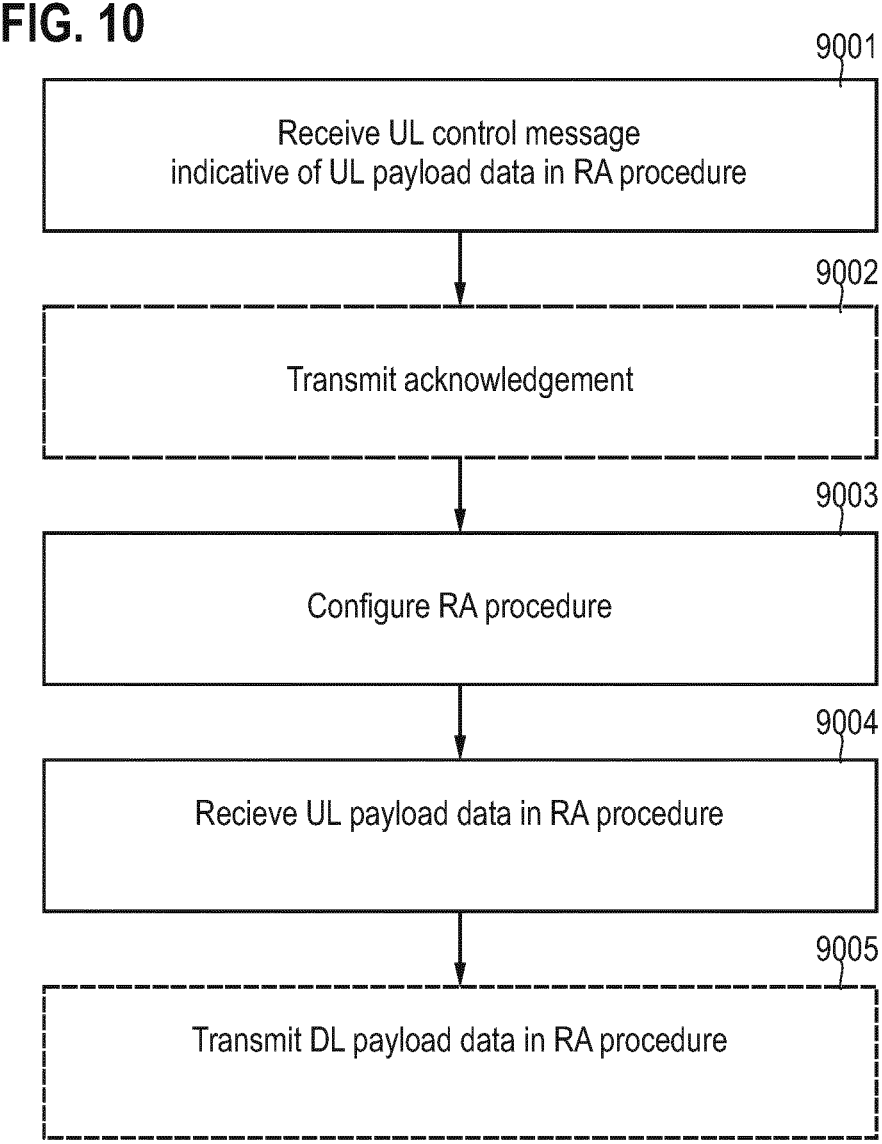

EARLY DATA TRANSMISSION IN A RANDOM ACCESS PROCEDURE

TECHNICAL FIELD

The present application relates to a method and devices for communicating payload data in a random access procedure.

BACKGROUND

A terminal, also known as terminal device or user equipment (UE), configured to wirelessly communicate with a base station (BS) of a network may be in a disconnected state or idle state or initial state. Then, for connecting to the network, the UE may transition into a connected state by performing a random access (RA) procedure. Triggers for performing the random access procedure may include uplink (UL) data scheduled or queued for transmission and/or receipt of a downlink paging indicative of downlink (DL) data scheduled for transmission and/or a schedule for a downlink data transmission. Typically, the RA procedure includes multiple messages, e.g., four messages; RA message 1 in UL direction, RA message 2 in DL direction, RA message 3 in UL direction and RA message 4 in DL direction. Details of such a RA procedure in the 3GPP Long Term Evolution (LTE) framework are described in 3GPP Technical Specifications (TSs) 36.211, 36.231, 36.321, and 36.331.

For many Internet of Things (IoT) applications the amount of data to be transmitted on the user plane (also called payload data or application layer data) in each connection occasion is relatively small and therefore there is a concept to be defined in 3GPP denoted as Early Data Transmission (EDT) for Rel-15 eMTC and NB-IoT. With EDT the UE can reduce the amount of signaling for small data transmissions by including UL payload data into the RA message 3 transmission. Also, the network can transmit DL payload data in the RA message 4 transmission, in order to enable application/payload data in both directions with the EDT concept.

At a point in time when the RA message 3 is transmitted from the UE to the network or BS, there is no user plane transport bearer for application data set up. Hence, EDT is a method to include a container of payload data, even before the user plane transport bearer has been configured.

However, such techniques of EDT face certain restrictions and drawbacks. One major limitation is the amount of data that is possible to be transmitted. The data to be transmitted needs to fit into the RA message 3 for UL EDT and RA message 4 for DL EDT, essentially limiting the data size to tens or a few hundred bytes, e.g., 125 bytes.

Another limitation is that the EDT function within the single RA procedure is not very suitable for a transmit and response action from a UE to an application server and back. If, for example, the UE connects to the network and transmits UL payload data via EDT to an application server, the server may respond to the UE based on the transmitted UL payload data within a few seconds. However, such response cannot fit into the same RA procedure, since RA message 4 is expected to be transmitted immediately (within a few milliseconds or within a few frames) after RA message 3. Hence, the application response may be sent in another connection, which could be initiated via a downlink initiated paging or possibly via another UE-initiated RA procedure. However, this may introduce additional communication overhead and power consumption.

SUMMARY

Therefore, a need exists for advanced RA procedures. In particular, a need exists for techniques, which overcome or mitigate at least some of the above-identified restrictions and drawbacks.

This need is met by the features of the independent claims. The features of the dependent claims define embodiments.

A method includes communicating, between a UE and a BS, an UL control message of a RA procedure. The UL control message includes an indicator indicative of UL payload data queued for transmission during the RA procedure. Furthermore, according to the method, the RA procedure is configured depending on the indicator.

In the RA procedure configured in accordance with the indicator, the UL payload data is communicated.

The UL payload data may include for example UL application layer data communicated to a server in an application layer. The UL payload data may include any kind of upper layer data in a layer above Layer 3 of the OSI layer model, e.g., originating from layer 7. The UL payload data may include user plane data, i.e. the UL payload may include application or user data that conventionally would be transmitted via user plane, for example, when a radio resource connection (RRC) has been established and a dedicated radio bearer (DRB) is setup For example, a timing of messages of the RA procedure may be configured depending on the indicator. For example, a point in time at which certain messages of the RA procedure are communicated may be set accordingly. For example, a repetition rate or count of repetitions of one or more messages of the RA procedure may be configured depending on the indicator.

Multiple repetitions of a message, as used herein, may refer to a scenario where a given message—e.g., defined by a certain header or message type—is repeated more than once. From repetition to repetition, the payload included in the message may vary. Multiple repetitions of a message may enable to transmit larger amounts of payload. For example, to deliver in total 3000 bits of payload information, the payload may be communicated by three repetitions of the message, each repetition including 1000 bits. Further, in IoT context, repetitions may comprise the transmission of the same information repeatedly to obtain time diversity.

The RA procedure, by means of the indicator, is configured on-the-fly, i.e. within the RA procedure itself: the indicator for configuration of the RA procedure is communicated in the RA procedure itself, for example in RA message 1. Hence, configuring the RA procedure depending on the indicator may in particular include configuring a remaining part (for example RA message 2, RA message 3 and/or RA message 4) of the RA procedure depending on the indicator. In detail, a part subsequent of the RA access procedure following the UL control message including the indicator may be configured. For example, the above described RA message 2, RA message 3 and RA message 4 may be configured depending on the indicator. Further, configuring the remaining part of the RA procedure may include configuring a message flow, for example a number of messages and/or a timing of messages of the RA procedure. This may enable to communicate more payload data within the RA procedure and may enable to include responses from an application layer within a single RA procedure.

Communicating as used herein may relate to transmitting and/or receiving. For example within the RA procedure, the UE may send multiple RA message 3 each including payload data to the BS. The BS may concatenate this payload and may send it to a server. The server may respond and the response payload may be split up by the BS in multiple RA message 4 each including payload data.

The indicator may be a 1-bit flag. For example, the indicator may indicate whether or whether not there is UL payload data queued for transmission. In other examples, the indicator may be a multi-bit indicator. Here, the indicator may be indicative of additional information such as the size of the data, a quality of service associated with a service of the data, a type of the data, the service of the data, a round-trip time associated with the data, etc.

The method may be implemented in a UE. The UE may be a mobile telephone, for example a smart phone, or an Internet of Things (IoT) device. According to the method, an UL control message of a RA procedure may be transmitted from the UE to a BS. The UL control message includes an indicator indicative of UL payload data queued for transmission during the RA procedure. Depending on the indicator, the RA procedure performed by the UE is configured, and in the RA procedure configured in accordance with the indicator, the UL payload data is transmitted from the UE to the BS.

The method may, alternatively or additionally, be implemented in BS or by devices providing radio access functionality of a communication network. The BS may receive, from a UE, UL control message of a RA procedure. The UL control message includes an indicator indicative of UL payload data queued for transmission during the RA procedure. Depending on the indicator, the BS configures the RA procedure, and receives, in the RA procedure configured in accordance with the indicator, the UL payload data from the UE.

The UL control message may include a RA message of the RA procedure, which includes a RA preamble sequence (hereinafter simply referred to as RA preamble) of the UE. For example, the UL control message may be implemented by the so-called "RA message 1" of the RA procedure in 3GPP network environments.

As a general rule, various options are available for implementing the indicator. The RA preamble may implement the indicator. For example, a specifically predefined subset of RA preambles from a pool of predefined RA preambles may be used to indicate certain information as indicator for configuring the RA procedure. Then, by selecting the appropriate RA preamble from the pool of preambles inside or outside the predefined subset, it is possible to provide the indication of the queued UL payload data. In other words, the RA preamble can implement the indicator. As an alternative, the RA message may include the RA preamble and the indicator as separate information field. The separate information field for the indicator may be added to the RA message—beyond the RA preamble. The indicator may be placed in currently unused fields of the RA message. As will be appreciated, the indicator may be an implicit indicator or an explicit indicator.

Optionally or as an alternative, the UL control message may include a Layer 3 connection request message of the RA procedure. For example, the UL control message may be implemented by the RA message 3 of the RA procedure in 3GPP networks.

Here, the indicator may be included in a specific information field of the RA message 3. For example, the indicator may be included in a RRC information field.

The indicator may be indicative of a size of the UL payload data. The indicator may be indicative of the size of the UL payload data in terms of a byte count or symbol count, or in terms of a block count of blocks of UL payload data of a predefined size. Furthermore, the indicator may be indicative the size of the UL payload data by a selector value indicating the size of the UL payload data by selecting one predefined size of a plurality of predefined sizes.

Depending on the indicator, configuring the RA procedure may include setting a count of repetitions of a Layer 3 connection request message—e.g., the RA message 3—of the RA procedure, each Layer 3 connection request message including UL payload data. Thus, the RA procedure may be configured such that a plurality of repetitions of the Layer 3 connection request messages are communicated for delivering the UL payload data.

In some scenarios, it would be possible to communicate a plurality of repetitions of a Layer 3 connection response message. Thereby, it may be possible to acknowledge receipt of each of a plurality of repetitions of the Layer 3 connection request message. For this, the multiple repetitions of the Layer 3 connection request message and the multiple repetitions of the Layer 3 connection response message be communicated interleaved in time domain, i.e., in an alternating sequence.

Optionally, multiple repetitions of the Layer 3 connection response message may be used to communicate larger sizes of DL payload data. Then, it may not be required to communicate the multiple repetitions of the Layer 3 connection request message and the multiple repetitions of the Layer 3 connection response message interleaved in time domain.

Again, there are various options available of implementing the respective indicator: The number of Layer 3 connection request messages may be configured in the RA message 1 by including the indicator as explained above. In a further scenario, the respective indicator may be included in the first RA message 3. Further, each RA message 3 may provide the indicator indicating if a further RA message 3 including UL payload data will follow within the same RA procedure, i.e., an incremental indicator. For example, the indicator may be implemented as a dedicated information, i.e. bits in the RA message 1 carrying this information. Hence, the indicator may be implemented as an explicit indicator. In another scenario, the indicator may be implemented as an implicit indicator. For example, the indicator may be implemented by defining a set of preambles for various message sizes or defining a set of RACH resources for various message sizes. For example, preambles #1 to #15 may be used for normal size, #16 to #31 may be used for RA message 3 including one transmission with data, #32 to #47 may be used for RA message 3 including two transmissions with data, etc.

The method may further include communicating a RA response message of the RA procedure. The RA response message may include a scheduling grant for the UL payload data. The scheduling grant may depend on the indicator. For example, a size of the scheduled resources and/or a timing of the scheduled resources may be selected by the BS in accordance with the indicator. The RA response message may be implemented by the RA message 2.

The scheduling grant may be indicative of repetitively re-occurring resources for communicating multiple repetitions of a RA message 3. This may corresponds to semi-persistent scheduling.

Furthermore, the method may include selectively aborting the RA procedure in response to communicating the payload UL data and depending on the scheduling grant. Aborting the RA procedure may be communicated from the BS to the UE in the RA message 2 or in the RA message 4 of the RA procedure in 3GPP network environments. For example, if the scheduling grant allocates sufficient resources for completing communication of the UL payload data, then the RA procedure may be aborted; otherwise, a user plane transport bearer may be set up. Not having to set up the user plane transport bearer saves resources, e.g., in terms of energy consumption at the UE and in terms of control signaling overhead on wireless link.

Furthermore, the method may include communicating a first Layer 3 connection response message including a further indicator indicative of a count of at least one second Layer 3 connection response message, and communicating the at least one second Layer 3 connection response message in accordance with the further indicator. The first and second Layer 3 connection response messages may each be implemented by a RA message 4 of the RA procedure in a 3GPP LTE 4G framework or 3GPP New Radio (NR) 5G framework.

In each repetition of the connection response message, DL payload data may be included. Thereby, larger amounts of payload data may be communicated within the RA procedure in the DL direction also by increasing the count of the Layer 3 connection response message. By indicating in the first Layer 3 connection response message a count of at least one second Layer 3 connection response message, the amount of DL payload data communicated during the RA procedure may be flexibly varied and correspondingly configured.

Configuring the RA procedure depending on the indicator may include setting a size of an UL payload data field of a Layer 3 connection request message of the RA procedure depending on the indicator. For example, the Layer 3 connection request message may be implemented by the RA message 3 of the RA procedure in 3GPP networks. Depending on the indicator, a size information for the UL payload data field of the Layer 3 connection request message may be included in at least one of RA message 1 or RA message 3 of the RA procedure.

Configuring the RA procedure depending on the indicator may include setting a delay of a Layer 3 connection response message of the RA procedure with respect to a Layer 3 connection request message of the RA procedure depending on the indicator. The delay may not be smaller than 200 ms, or may be at least 1 second. The delay may have a value in the range of 200 ms to 5 seconds. The delay may be communicated between the BS and the UE in any message of the RA procedure and may be determined in the UE or in the BS or negotiated between the UE and the BS. Additionally or as an alternative, the delay may be preconfigured, provided at an initial attachment or registering of the UE at the BS, or by a dedicated signaling at e.g. RRC Connection Release or Suspend. The delay may specify the time delay in an absolute manner as a number of ms or seconds. Alternatively, the delay may be indicated as a counter of multiple radio frames, DRX intervals or other system specific units, which correspond to a time delay value.

In this regard, the indicator may be indicative of a type of the UL payload data. For example, the indicator could be indicative of a specific service/application associated with the UL payload data. Then, based on knowledge of typical higher-layer round-trip times (RTTs) for this type of UL payload data, the delay may be set appropriately. In other examples, the indicator may be directly indicative of the RTT or the delay. This may be based on respective historical data accumulated at the UE. This helps to facilitate transmission of DL payload data being a response to the UL payload data in the RA procedure.

For example, the Layer 3 connection response message may include a RTT indicator indicative of a RTT of communication between the BS and the destination of the UL payload data—e.g., a server in a data network such as the Internet and accessed by the network via a gateway node. The destination of the UL payload data may include for example a server or a network application. Based on the provided RTT, the UE and/or the BS may determine the delay for setting the delay in the RA procedure. Respective historical data may be accumulated.

The UL payload data may be included in a Layer 3 connection request message of the RA procedure, for example in RA message 3 of the RA procedure in 3GPP network environments. The method may further include communicating a Layer 3 connection response message including DL payload data from an application server to which the UL payload data is directed. For example, the Layer 3 connection response message may be implemented by a RA message 4 of the RA procedure in 3GPP network environments. The DL payload data may be a response to the UL payload data. The DL payload data may be triggered by the UL payload data. The application server may include any device to which the UL payload data is directed, for example any device which terminates UL data in a layer above the Layer 3.

A delay between the Layer 3 connection request message and the Layer 3 connection response message may be set in the RA procedure as described above. Therefore, the method enables data exchange between the UE and an application server during the RA procedure even before a user plane transmission bearer has been set up. For example, in response to communicating UL and/or DL payload data, the RA procedure may be aborted and the UE may transition to an idle mode. It is not required to fully set up the user plane transmission bearer. The data exchange provided within the RA procedure may be sufficient in MTC or IoT applications for notifying messages or measurement values such that a user plane communication may be avoided and communication resources as well as electrical energy may be saved.

The method may further include communicating a Layer 3 connection response message—e.g., implemented by the RA message 4—including a positive or negative acknowledgement of reception of the UL payload data. Thus, a reliable communication of the UL payload data between the UE and the BS may be accomplished.

A delay between the Layer 3 connection request message including the UL payload data and the Layer 3 connection response message including the acknowledgement may be smaller than 500 ms, optionally smaller than 50 ms, further optionally smaller than 10 ms. Thereby, an Automatic Repeat Request (ARQ) protocol may be implemented on Layer 2 or Layer 3.

A computer program product or a computer program includes program code that may be executed by a control circuitry of a device, for example a BS or a UE. Executing the program code may cause the control circuitry to perform a method, which includes communicating, between a UE and a BS, an UL control message of a RA procedure. The UL control message includes an indicator indicative of UL payload data queued for transmission during the RA procedure. The method includes furthermore configuring the RA procedure depending on the indicator, and communicating, in the RA procedure configured in accordance with the indicator, the UL payload data.

For example, a computer program product or a computer program may include program code that may be executed by a control circuitry of a UE, for example a user equipment like a mobile telephone or smart phone. Executing the program code may cause the control circuitry to perform a method, which includes transmitting, to a BS of a wireless network, an UL control message of a RA procedure, wherein the control message includes an indicator indicative of UL payload data queued for transmission during the RA procedure. The method includes furthermore configuring the RA procedure depending on the indicator, and transmitting, in the RA procedure configured in accordance with the indicator, the UL payload data.

In another example, a computer program product or a computer program may include program code that may be executed by a control circuitry of a BS, for example a BS of a wireless communication network. Executing the program code may cause the control circuitry to perform a method, which includes receiving, from a UE, an UL control message of a RA procedure, wherein the UL control message includes an indicator indicative of UL payload data queued for transmission during the RA procedure. The method includes additionally configuring the RA procedure depending on the indicator, and receiving, in the RA procedure configured in accordance with the indicator, the UL payload data.

A UE of a network, for example a wireless communication network, in particular a wireless cellular communication network, includes control circuitry configured to perform: transmitting, to a BS of the wireless network, an UL control message of a RA procedure, wherein the UL control message includes an indicator indicative of UL payload data queued for transmission during the RA procedure. The control circuitry is also configured to perform: configuring the RA procedure depending on the indicator, and transmitting, in the RA procedure configured in accordance with the indicator, the UL payload data.

The control circuitry of the UE is furthermore configured to perform the above-described method and the embodiments thereof.

A BS of a network, for example a wireless communication network or a wireless cellular communication network, includes control circuitry configured to perform: receiving, from a UE, an UL control message of a RA procedure, the UL control message including an indicator indicative of UL payload data queued for transmission during the RA procedure. The control circuitry is furthermore configured to perform: configuring the RA procedure depending on the indicator, and receiving, in the RA procedure configured in accordance with the indicator, the UL payload data.

The control circuitry of the BS is furthermore configured to perform the above described methods and the embodiments thereof.

It is to be understood that the features mentioned above and those yet to be explained below may be used not only in the respective combinations indicated, but also in other combinations or in isolation without departing from the scope of the invention.

BRIEF DESCRIPTION OF THE DRAWINGS

FIG. 7A is a signaling diagram of a RA procedure including EDT according to various examples.

FIG. 10 is a flowchart of a method according to various examples.

DETAILED DESCRIPTION OF EMBODIMENTS

Figure 1:
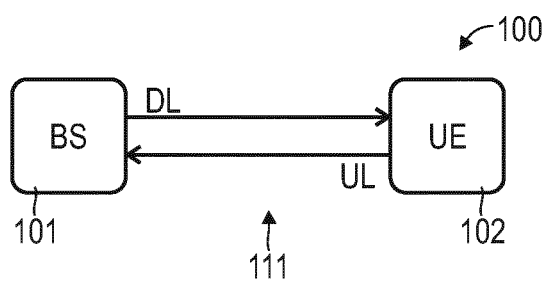
FIG. 1 schematically illustrates a BS and a UE communicating on a wireless link according to various examples.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof. Same reference signs in the various drawings refer to similar or identical components, functions or actions.

Hereinafter, techniques related to a RA procedure of a UE connecting to a network are described. For example, the network may be a cellular network including multiple cells, wherein each cell is defined by one or more BSs. Example network architectures include the 3GPP Long Term Evolution (LTE) or NR architecture. For example, the 3GPP LTE and NR protocols employ a RA procedure including four messages exchanged between the UE and the BS (4-step RA procedure).

According to examples, in a RA procedure, a UE transmits a RA message. The RA message includes a RA preamble. The RA message which includes the RA preamble is also referred to as RA message 1.

The RA preamble as used herein may be a pattern or signature. The value of the RA preamble may facilitate distinguishing between different UEs. The RA preamble may be selected from a set of candidate preambles, e.g., 64 or 128 candidate preambles. The different candidate preambles may use orthogonal codes. For example, a Zaddoff-Chu sequence may be used for generating the RA preamble.

The Zaddoff-Chu sequence may form a base sequence or root sequence. Different cyclic shifts may then be applied to obtain the specific RA preamble. Different UEs may use different cyclic shifts. Code division duplexing is possible. Said selection may occur randomly or non-randomly, e.g., depending on whether a contention based RA procedure or a non-contention based RA procedure is employed. For example, the document 3GPP TSG RAN WG1 #86 bis R1-1609119 discloses techniques associated with RACH preamble design for 3GPP NR that could be employed in connection with determining the RA preamble.

In an LTE environment, a UE may use a contention based RA procedure if it has not been allocated a preamble index. This may happen as part of a procedure known as RRC connection establishment. In this example, the UE may wish to send the BS an RRC message known as an RRC connection request, in which it asks to move from an idle state (RRC_IDLE) to a connected state (RRC_CONNECTED). As no resources are allocated for sending a corresponding request message, the UE randomly chooses a preamble sequence from a pool of candidate preamble sequences, this pool, e.g., being provided by the network. The UE then transmits the selected preamble in RA message 1. There is a risk of contention, if two or more UEs transmit on the same resource blocks using the same preamble sequence. The BS sends the UE a scheduling command followed by a RA response including an UL grant as RA message 2. Using the UL grant, the UE sends a RRC connection request message (RA message 3). As part of the message, the UE uniquely identifies itself. There is still the risk of contention between the UEs that initiated the procedure, but if one of the transmissions is stronger than the others, then the BS will be able to decode it. The other transmissions will cause interference. The BS sends a RRC connection response message (RA message 4) including an acknowledgement and echoing back the RRC message that the UE transmitted in RA message 3, so it includes the identity of the successful UE. Thus, a contention may be resolved and user plane communication may be set up.

As explained with respect to the figures in greater detail hereinafter, transmission of payload data may be accomplished already during the above-described RA procedure. Thus, it is not required to complete set-up of a user-plane transport bearer prior to communicating the payload data. Transmission of the payload data may be in accordance with the EDT framework.

For example, payload data may be included in the RRC connection request message (RA message 3), for example multiplexed on the same transmission time interval (TTI). Furthermore, in the various examples described herein, multiple repetitions of RA message 3 may be communicated from the UE to the BS, each repetition including corresponding payload data. Different repetitions of the RA message 3 may include different fractions of an overall data packet. Thus, UL payload data may be communicated from the UE to the BS during the RA procedure.

Optionally, DL payload data may be communicated during the RA procedure in the RRC response message (RA message 4). Multiple repetitions of RA message 4 may be sent from the BS to the UE, each repetition including corresponding DL payload data. Different repetitions of the RA message 4 may include different fractions of an overall data packet.

Corresponding one or more indicators indicative of a size of the UL and/or DL payload data or the count of RA message 3 repetitions and/or RA message 4 repetitions may be included in any one of the messages of the RA procedure, specifically RA message 1, RA message 2, or RA message 4.

In some examples, a delay between RA message 3 and RA message 4 may be configured in the RA procedure for example by including corresponding indicators in any one of RA messages 1 to 3.

FIG. 1 schematically illustrates a wireless communication network 100 that may benefit from the techniques disclosed herein. The network may be a 3GPP-standardized network such as 3G, 4G-LTE, or upcoming 5G-NR. Other examples include point-to-point networks such as Institute of Electrical and Electronics Engineers (IEEE)-specified networks, e.g., the 802.11x Wi-Fi protocol or the Bluetooth protocol. Further examples include 3GPP NB-IOT or eMTC networks.

The network 100 includes a BS 101 and a UE 102. A wireless link 111 is established between the BS 101 and the UE 102. The wireless link 111 includes a DL link from the BS 101 to the UE 102; and further includes an UL link from the UE 102 to the BS 101. Time-division duplexing (TDD), frequency-division duplexing (FDD), space-division duplexing (SDD), and/or code-division duplexing (CDD) may be employed for mitigating interference between UL and DL. Likewise, TDD, FDD, SDD, and/or CDD may be employed for mitigating interference between multiple UEs communicating on the wireless link 111 (not shown in FIG. 1).

The UE 102 may be one of the following: a smartphone; a cellular phone; a table; a notebook; a computer; a smart TV; an MTC device; an eMTC device; an IoT device; an NB-IoT device; a sensor; an actuator; etc.

Figure 2:
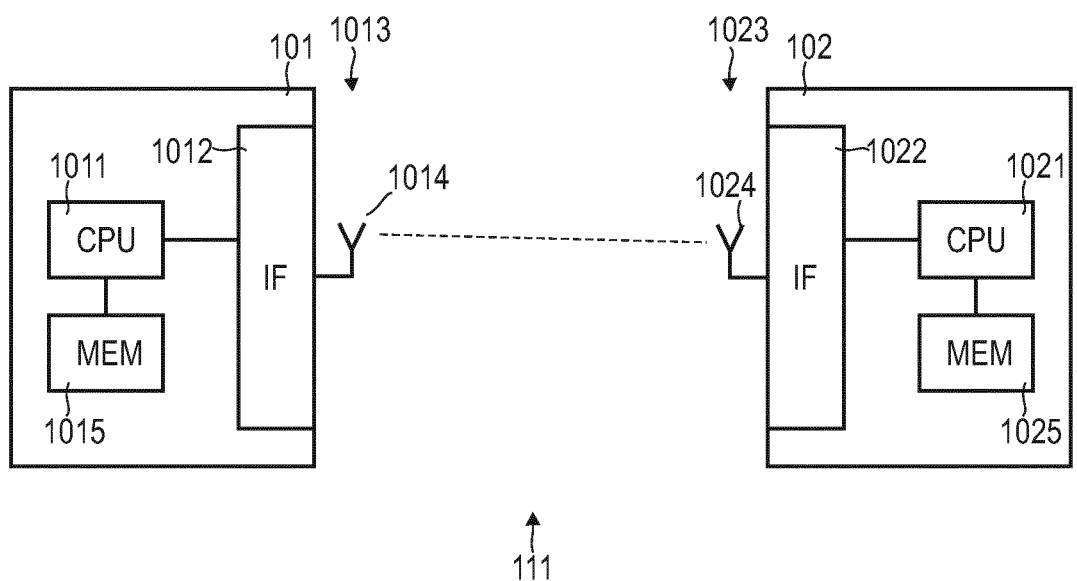
FIG. 2 schematically illustrates details of the BS and the UE according to various examples.

FIG. 2 schematically illustrates the BS 101 and the UE 102 in greater detail. The BS 101 includes a processor (CPU) 1011 and an interface (IF) 1012, sometimes also referred to as frontend. The interface 1012 is coupled via antenna ports (not shown in FIG. 2) with an antenna array 1013 including one or more antennas 1014. In some examples, the antenna array 1013 may include at least 30 antennas 1014, optionally at least 110 antennas, further optionally at least 200 antennas. Sometimes, a scenario implementing a large number of antennas 1014 is referred to as full dimension multi-input multi-output (FD-MIMO) or massive multi-input multiple-output (Massive MIMO, MaMi). Each antenna 1014 may include one or more electrical traces to carry a radio frequency current. Each antenna 1014 may include one or more LC-oscillators implemented by the electrical traces. Each trace may radiate electromagnetic waves with a certain beam pattern. The antenna array 1013 may facilitate transmit beamforming and receive beamforming.

The BS 101 further includes a memory (MEM) 1015, e.g., a non-volatile memory. The memory may store program code that can be executed by the processor 1011. Thus, the processor 1011 and the memory 1015 form a control circuitry. Executing the program code may cause the processor 1011 to perform techniques with respect to: receiving, from the UE 102, an UL control message of a RA procedure, the UL control message including an indicator indicative of UL payload data queued for transmission during the RA procedure; configuring the RA procedure depending on the indicator; and receiving, in the RA procedure configured in accordance with the indicator, the UL payload data.

The UE 102 includes a processor (CPU) 1021 and an interface (IF) 1022, sometimes also referred to as frontend. The interface 1022 is coupled via antenna ports (not shown in FIG. 2) with an antenna array 1023 including one or more antennas 1024. In some examples, the antenna array 1023 may include at least 6 antennas, optionally at least 16 antennas, further optionally at least 32 antennas. Generally, the antenna array 1023 of the UE 102 may include fewer antennas 1024 then the antenna array 1013 of the BS 101. Each antenna 1024 may include one or more electrical traces to carry a radio frequency current. Each antenna 1024 may include one or more LC-oscillators implemented by the electrical traces. Each trace may radiate electromagnetic waves with a certain beam pattern. The antenna array 1023 may facilitate transmit beamforming and receive beamforming.

The UE 102 further includes a memory (MEM) 1025, e.g., a non-volatile memory. The memory 1025 may store program code that can be executed by the processor 1021. Thus, the processor 1021 and the memory 1025 form a control circuitry. Executing the program code may cause the processor 1021 to perform techniques with respect to: transmitting, to the BS 101, an UL control message of a RA procedure, the UL control message including an indicator indicative of UL payload data queued for transmission during the RA procedure; configuring the RA procedure depending on the indicator; and transmitting, in the RA procedure configured in accordance with the indicator, the UL payload data.

Figure 3:
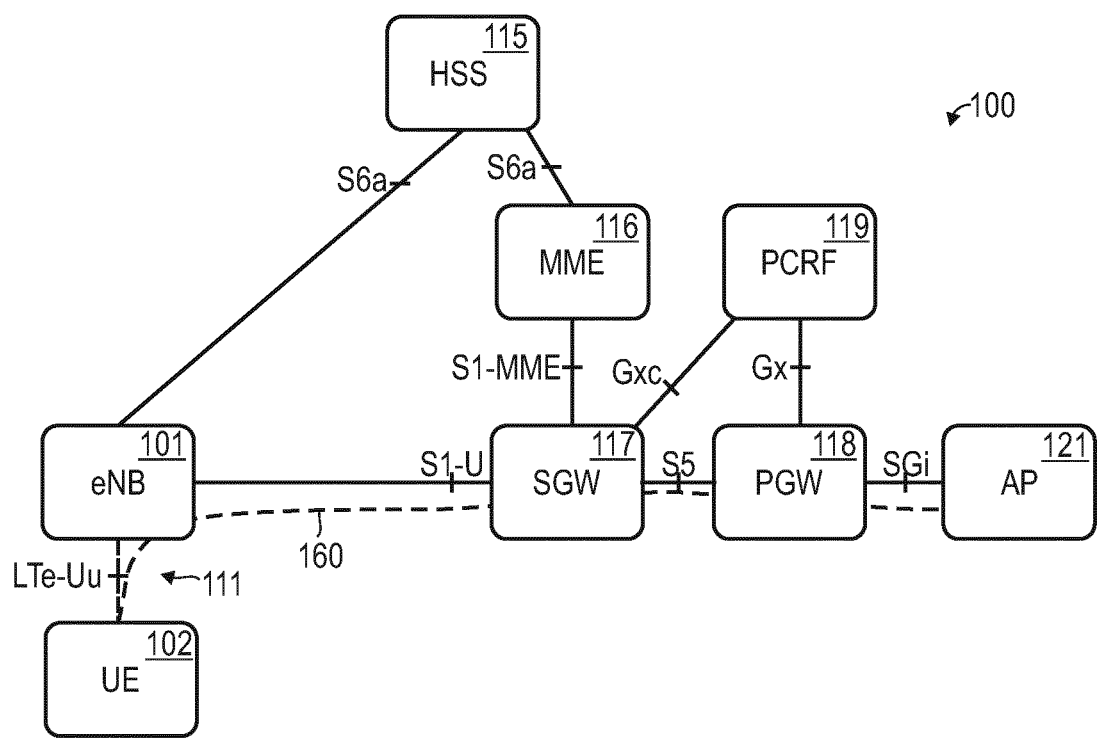
FIG. 3 schematically illustrates a cellular network according to the 3GPP LTE architecture and according to various examples.

FIG. 3 illustrates aspects with respect to the architecture of a cellular network 100 according to some example implementations. In particular, the cellular network 100 according to the example of FIG. 3 implements the 3GPP LTE architecture, sometimes referred to as evolved packet system (EPS). This, however, is for exemplary purposes only. In particular, various scenarios will be explained in the context of the wireless link 111 between the UE 102 and the BS 102 operating according to the 3GPP LTE radio access technology (RAT) for illustrative purposes only. Similar techniques can be readily applied to various kinds of 3GPP-specified RATs, such as Global Systems for Mobile Communications (GSM), Wideband Code Division Multiplex (WCDMA), General Packet Radio Service (GPRS), Enhanced Data Rates for GSM Evolution (EDGE), Enhanced GPRS (EGPRS), Universal Mobile Telecommunications System (UMTS), and High Speed Packet Access (HSPA), and corresponding architectures of associated cellular networks. The network 100 may be operating according to the 3GPP NR protocol. A further particular example is the 3GPP NB-IoT RAT. The 3GPP NB-IoT RAT may be based on the 3GPP LTE RAT, i.e., the Evolved UMTS Terrestrial Radio Access (E-UTRA). Further, the NB-IoT RAT may be combined with the EPS as illustrated in FIG. 3. The various examples disclosed herein may be readily implemented for the 3GPP NB-IoT RAT, alternatively or additionally. Similarly, the techniques described herein may be employed for MTC. Other examples include other types of networks, e.g., Institute of Electrical and Electronics Engineers (IEEE) 802.11X Wireless Local Area Network, Bluetooth or Zigbee.

The 3GPP LTE RAT implements a HARQ protocol. The HARQ protects data communicated via the wireless link 111. FEC and retransmission are employed in this respect.

The UE 102 is registered to the network 100. In the example of FIG. 3, the UE 102 is connected to the network 100 via the wireless link 111 to a BS 101 of the cellular network 100. The BS 101 and the UE 102 implement the evolved UMTS terrestrial radio access technology (E-UTRAN). Therefore, the BS 101 is labeled evolved node B (eNB) in FIG. 3. In NR, the BS 101 is known as gNodeB (gNB). In other examples, the UE 102 may be registered to the network 100, but no active data connection 160 may be maintained. To set-up the connection 160, a RA procedure may be performed by the UE 102 and the BS 101.

For example, the UE 102 may be selected from the group including: a smartphone; a cellular phone; a table; a notebook; a computer; a smart TV; a MTC device, an IoT device; a sensor; an actuator; etc.

An MTC or IoT device is typically a device with a low to moderate requirement on data traffic volumes and loose latency requirements. Additionally, communication employing MTC or IoT devices should achieve low complexity and low costs. Further, energy consumption of an MTC or an IoT device should be comparably low in order to allow battery-powered devices to function for a comparably long duration: The battery life should be sufficiently long. For example, the IoT device may be connected to the EPS via the NB-IoT RAT.

Communication on the wireless link 111 can be in UL and/or DL direction. The BS 101 is connected with a gateway node implemented by a serving Gateway (SGW) 117. The SGW 117 may route and forward payload data and may act as a mobility anchor during handovers of the UE 102.

The SGW 117 is connected with a gateway node implemented by a packet data network Gateway (PGW) 118. The PGW 118 serves as a point of exit and point of entry of the cellular network for data towards a packet data network (PDN; not shown in FIG. 3): for this purpose, the PGW 118 is connected with an access point (AP) node 121 of the packet data network. The access point node 121 is uniquely identified by an access point name (APN). The APN is used by the UE 102 to seek access to the data network, e.g., an application server in the data network.

The PGW 118 can be an endpoint of an end-to-end connection 160 for packetized payload data of the UE 102. The end-to-end connection 160 may be used for communicating payload data of a particular service. Different applications/services may use different end-to-end connections 160 or may share, at least partly, a certain end-to-end connection.

In a 3GPP NR scenario, the SGW 117 and PGW 118 functionality may be implemented by a user plane function (UPF).

The end-to-end connection 160 may be implemented by one or more user plane transport bearers which are used to communicate payload data. An EPS bearer which is characterized by a certain set of quality of service parameters indicated by the QoS class identifier (QCI). The end-to-end connection may be, at least partly, defined on a Layer 2 or Layer 3 of a transmission protocol stack implemented by the BS 101 and the UE 102 for communicating on the wireless link 111. For example, in connection with the 3GPP LTE E-UTRAN, the data connection 160 may be implemented on the Radio Resource Control (RRC) layer.

A control layer of the core network includes a mobility management entity (MME) 116. The MME 116 functionality may be implemented by an Access and Mobility Management Function (AMF) and a Session Management Function (SMF) in a 3GPP NR framework.

The MME 116 handles mobility and security tasks such as paging and access credentials. The MME 116 also keeps track of the operational mode of the UE 102, e.g., whether the UE 102 operates in connected or disconnected mode. The MME 116 is the termination point of the non-access stratum (NAS) connection, i.e., a control connection implemented on the layer above the RRC layer.

A home subscriber server (HSS) 115 includes a repository that contains user- and subscriber-related information such as authentication and subscription information. In 3GPP NR, such functionality may be implemented by the Authentication Server Function (AUSF) and/or the Unified Data Management (UDM) functionality.

A Policy and Charging Rules Function 119 (PCRF) implements policy control to thereby facilitate a certain QoS. The respective function is implemented by the Policy Control Function (PCF) in the 3GPP NR framework.

Figure 4:
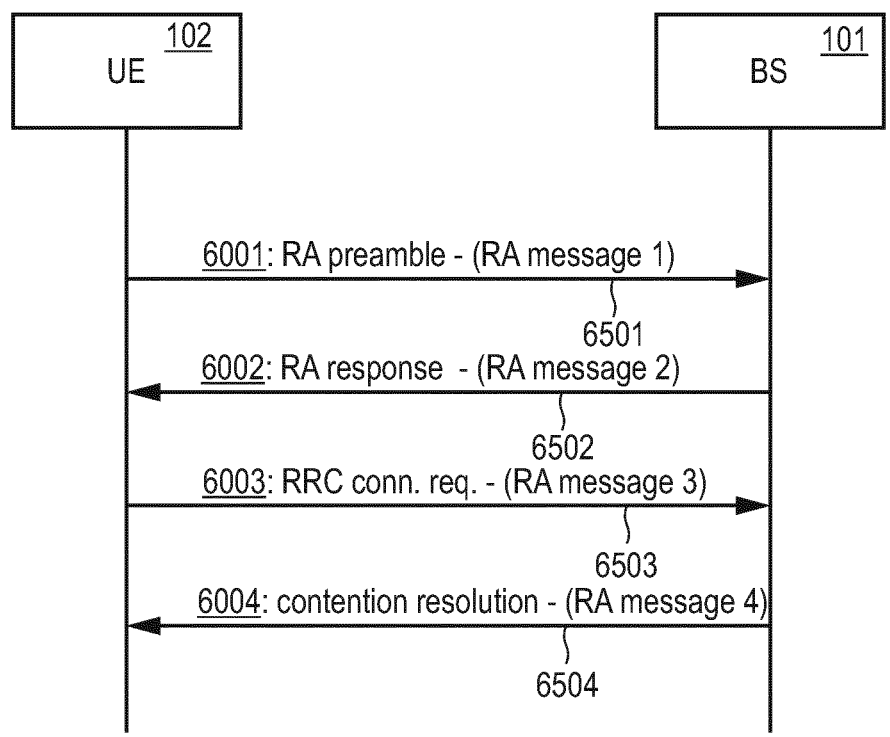
FIG. 4 is a signaling diagram of a RA procedure according to various examples.

FIG. 4 schematically illustrates aspects with respect to a RA procedure according to reference implementations. FIG. 4 is a signaling diagram of communication between the UE 102 and the BS 101.

In cellular communication protocols, defined for example by 3GPP in the LTE or NR framework, a connection setup procedure such as the RA procedure of FIG. 4 may comprise communication of several messages. Prior to initiating the RA procedure, the UE may periodically listen to information blocks broadcasted by one or more BSs of the network. For example, the broadcasted information blocks may include such information as a cell identity of the broadcasting BS. A connection setup attempt from a UE may then be initiated using the RA procedure, which may comprise a non-contention based procedure or a contention based procedure. In typical case, the contention based procedure may start with a four step handshake protocol as shown in FIG. 4.

At 6501, based on the broadcasted information, the UE 102 may transmit a randomly selected RA preamble 6001 to the BS, in a respective RA message 1. This RA message 1 may include furthermore a temporary identity of the UE 102.

In response to transmitting the preamble, the UE 102 may receive, at 6502, a RA response (RAR) message 6002 (also known as RA message 2) including for example a new temporary identity for the UE 102, timing adjustment information, and a scheduling grant for UL resources. The scheduling grant may be addressed to the UE's 102 RA Radio Network Temporary Identity (RA-RNTI).

Using these UL resources, the UE can send, at 6503, a RRC connection request 6003 (also known as RA message 3). For example, in the context of the 3GPP LTE protocol, the connection request may be native to the RRC layer of the transmission protocol stack, i.e., Layer 3 according to the Open System Interface (OSI) model. The RRC connection request 6003 may include a connection establishment cause.

In response to the RRC connection request 6003, the UE 102 may receive, at 6504, a contention resolution message 6004 (also known as RA message 4) to ensure the right UE is addressed. This message may also be referred to as RRC connection request response message 6004. This finalizes set-up of the data connection 160.

Then, the UE 102 can proceed with requesting and receiving data transmission grants, for example for user plane transmissions using the set-up data connection 160 as the user plane transmission bearer.

In the reference implementation of FIG. 4, the RA message 4 may be scheduled three subframes after the RA message 1. This limits the available delay between RA message 3 and RA message 3.

If the connection attempt of the UE 102 to the network 100 is successful, the data connection 160 may be established. Then, wireless communication of payload UL data and/or payload DL data along the data connection 160 can commence.

There are various trigger criteria conceivable for the RA procedure. Examples include reception of a network paging message by the UE 102 or reception of a wake-up signal. Further examples include UL payload data scheduled or queued for transmission to the network 100. Further examples include a transition of the UE 102 from an idle mode to a connected mode, e.g., RRC_IDLE to RRC_CONNECTED in 3GPP LTE.

FIG. 4 illustrates an example in which the RA message 1 6001 is successfully received by the BS 101 at 6501. Thus, the BS 101 responds with a RA message 2 6002. The UE 102 expects to receive the RA message 2 6002 within a certain time window. If the UE 102 does not receive any response or cannot decode the response, it may send a retransmission of the RA message 1 6001.

Figure 5:
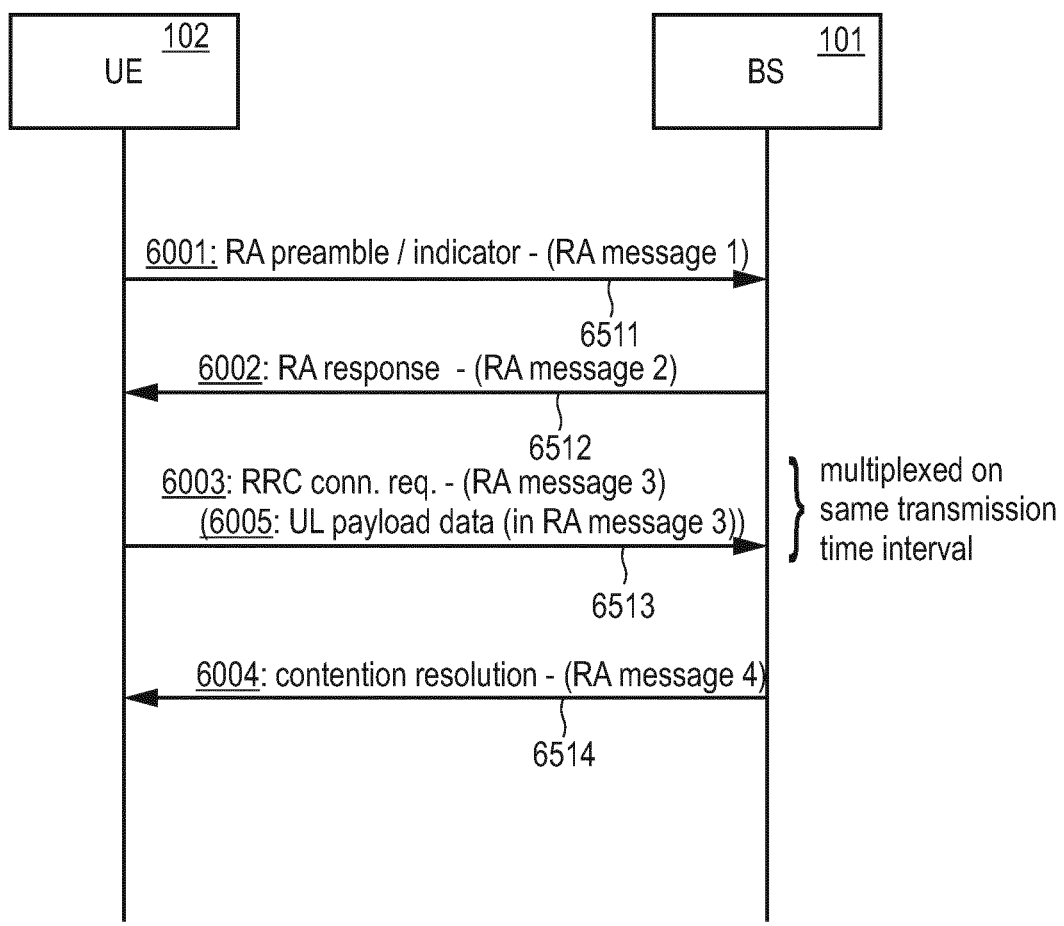
FIG. 5 is a signaling diagram of a RA procedure including EDT according to various examples.

FIG. 5 schematically illustrates aspects with respect to a RA procedure according to various examples. FIG. 5 schematically illustrates aspects with respect to EDT. Specifically, FIG. 5 illustrates an example in which UL payload data 6005 is communicated in the RA procedure, in particular in the RA message 3 6003.

A default or maximum size of the UL payload data 6005 communicated in connection with the RA message 3 transmission may be indicated by broadcasted system information from the network 100.

At 6511, a request for communicating UL payload data in connection with the RA message 3 6003 may be indicated by the UE 102 by a corresponding indicator within the RA message 1 6001. The message 6001 includes an indicator indicative of UL payload data queued for transmission. The indicator may be explicit or implicit.

For example, the indicator may be a 1-bit flag. The 1-bit flag may be indicative of whether or whether not there is UL payload data queued for transmission in the RA procedure. In another example, the indicator may be a multi-bit indicator. Then, more detailed information on the UL payload data may be signaled, e.g., a size, a type, a required QoS, an associated service, an approximate RTT, etc.

In the example of FIG. 5, the indicator is indicative of whether or whether not there is UL payload data queued for transmission. In the example of FIG. 5, the value of the indicator is set so as to indicate that there is in fact UL payload data queued for transmission.

At 6512, the BS 101 may acknowledge the request for communicating UL payload data in connection with the RA message 3 with a corresponding RA message 2 6002.

For example, the UL scheduling grant included in the message 6002 may accommodate for transmission of the UL payload data. This would be an implicit acknowledgement. For example, the RA response 6002 from the BS 101 may explicitly indicate if the request is granted or if the BS 101 requires the UE 102 to make a full connection set up, e.g., due to the large payload—thereby effectively delaying transmission of the UL payload data until the data connection 160 has been set up.

In the specific scenario of FIG. 5, the UL scheduling grant included in message 6002 allocates sufficient resources to facilitate EDT for the UL payload data. Thus, at 6513 the UE 102 transmits an RA message 3 6003 including the RRC connection request 6003 and the UL payload data 6005, for example multiplexed on the same TTI. For example, in the various examples described herein, it would be possible to piggyback the UL payload data in an information field of the RA message 3, e.g., a Non-Access Stratum (NAS) information field.

At 6514 the BS 101 may confirm reception of the UL payload data 6005 in the RA message 4 6004.

In the scenario of FIG. 5, it is thus possible to flexibly set properties of the UL scheduling grant in message 6002 depending on the indicator in message 6001. Thereby, it is possible to configure the RA procedure of FIG. 5 dynamically, depending on the indicator.

Figure 6A:
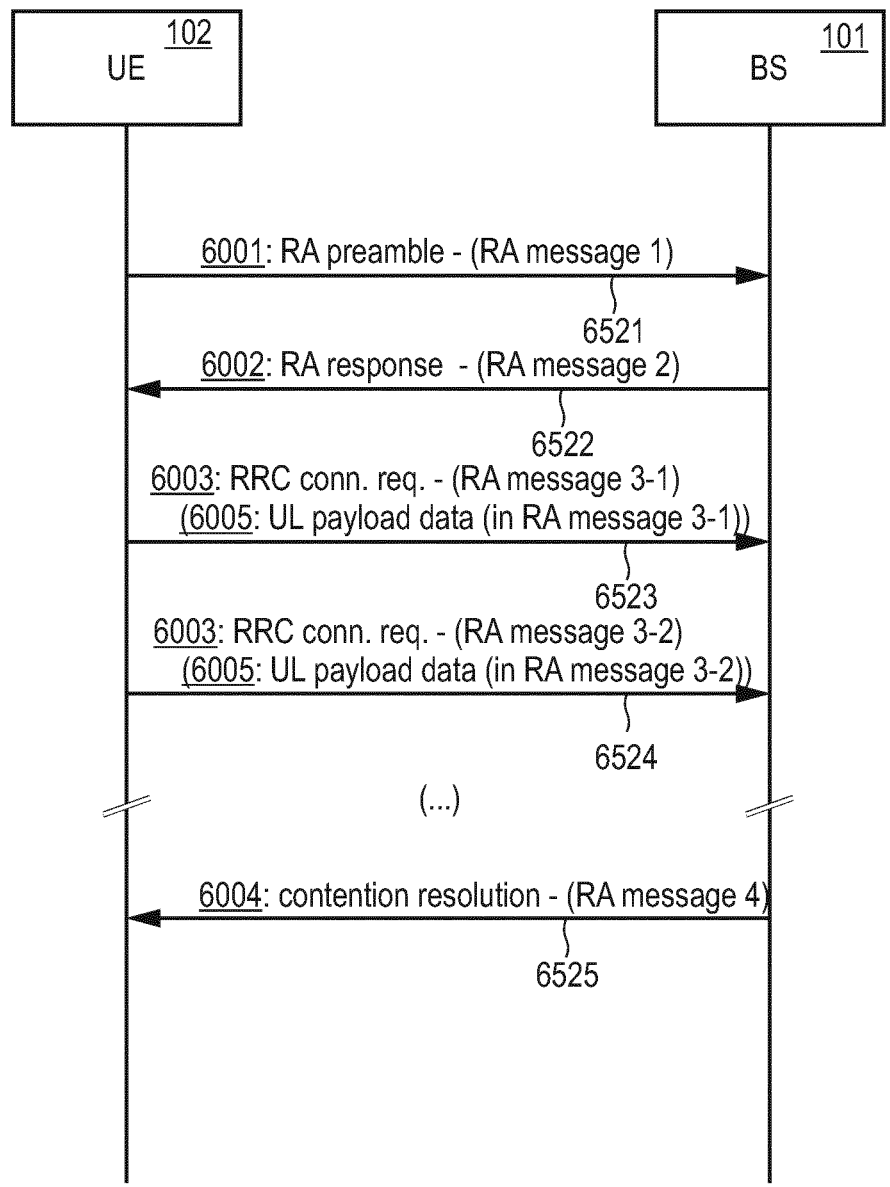
FIG. 6A is a signaling diagram of a RA procedure including EDT according to various examples.

FIG. 6A schematically illustrates aspects with respect to a RA procedure according to various examples. FIG. 6A schematically illustrates aspects with respect to EDT. Specifically, FIG. 6A illustrates an example in which UL payload data is communicated in the RA procedure, in particular in multiple repetitions of an RA message 3.

Specifically, FIG. 6A shows an example in which UL payload data 6005 is communicated in connection with multiple repetitions of the RA message 3 6003. 6521 and 6522 correspond to 6511 and 6512, respectively. For example, the response from the BS 101 in RA message 2 6002, at 6522, may grant the transmission of UL payload data in connection with the RA procedure In the scenario of FIG. 6A, the BS 101 may determine a maximum size for UL payload data in each RA message 3 6003 and may allow a plurality of repetitions of the RA message 3 6003 for communicating the UL payload data 6005. Thus, as indicated in FIG. 6A, at 6523 and 6524, a plurality of repetitions of RA message 3 6003 may be transmitted in succession—e.g., time offset—, each including UL payload data 6005. The UL payload data included in each repetition of the RA message 3 6003 may correspond to a different section of a high-layer data packet.

Although in FIG. 6A only two repetitions of the RA message 3 6003 are illustrated, any number of RA message 3 repetitions, in particular more than the indicated two repetitions, may be sent from the UE 102 to the BS 101.

The resources for communication of the multiple repetitions of the RA message 3 6003 is allocated by the BS 101 using a scheduling grant of RA message 2 6002, at 6522. Multiple repetitions of the RA message 3 6003 may be implemented using multiple dedicated scheduling grants, e.g., one per repetition. Alternatively, multiple repetitions of the RA message 3 6003 can be implemented using a joint resource allocation. This is sometimes referred to as semi-persistent scheduling (SPS) in which DL control information (DCI) is only sent once at the beginning, for example in RA message 2 6002. Here, the scheduling grant may be indicative of repetitive resources re-occurring over the course of time; then, the multiple repetitions of the RA message 3 6003 may be accommodated by the repetitive resources. SPS may be distinguished vis-à-vis multiple dedicated scheduling grants for each repetition.

The same principle of SPS can be applied for multiple repetitions of the RA message 4. For example, corresponding control information for activating SPS is only sent once for the first RA message 4 transmission.

Thus, by using multiple repetitions of the RA message 3 and/or multiple repetitions of the RA message 4, larger total payloads may be communicated.

In order to simplify operation, an acknowledge response from the BS 101 to the multiple RA message 3 transmissions may be combined to form a single acknowledge bundling message.

Instead of negotiating the amount of UL payload data in RA message 1 6001 and RA message 2 6002, RA message 1 6001 may indicate that a plurality of repetitions of RA message 3 6003 including UL payload data 6005 will be sent and in each of the repetitions of RA message 3 6003 an indicator may be provided which indicates if a subsequent repetition of RA message 3 6003 will follow; or if this repetition of the RA message 3 6003 is the last RA message 3 transmission of the RA procedure. For example, the UE 102 may include an indicator in the RA message 3, which is indicative of whether there is any continuation to this RA message 3. Thus, an incremental indicator may be provided indicative of whether further UL payload data needs to be communicated, beyond UL payload data already communicated.

In some examples, each such incremental indicator may be acknowledged, e.g., positively or negatively acknowledged. This is illustrated in connected with FIG. 6B.

Figure 6B:
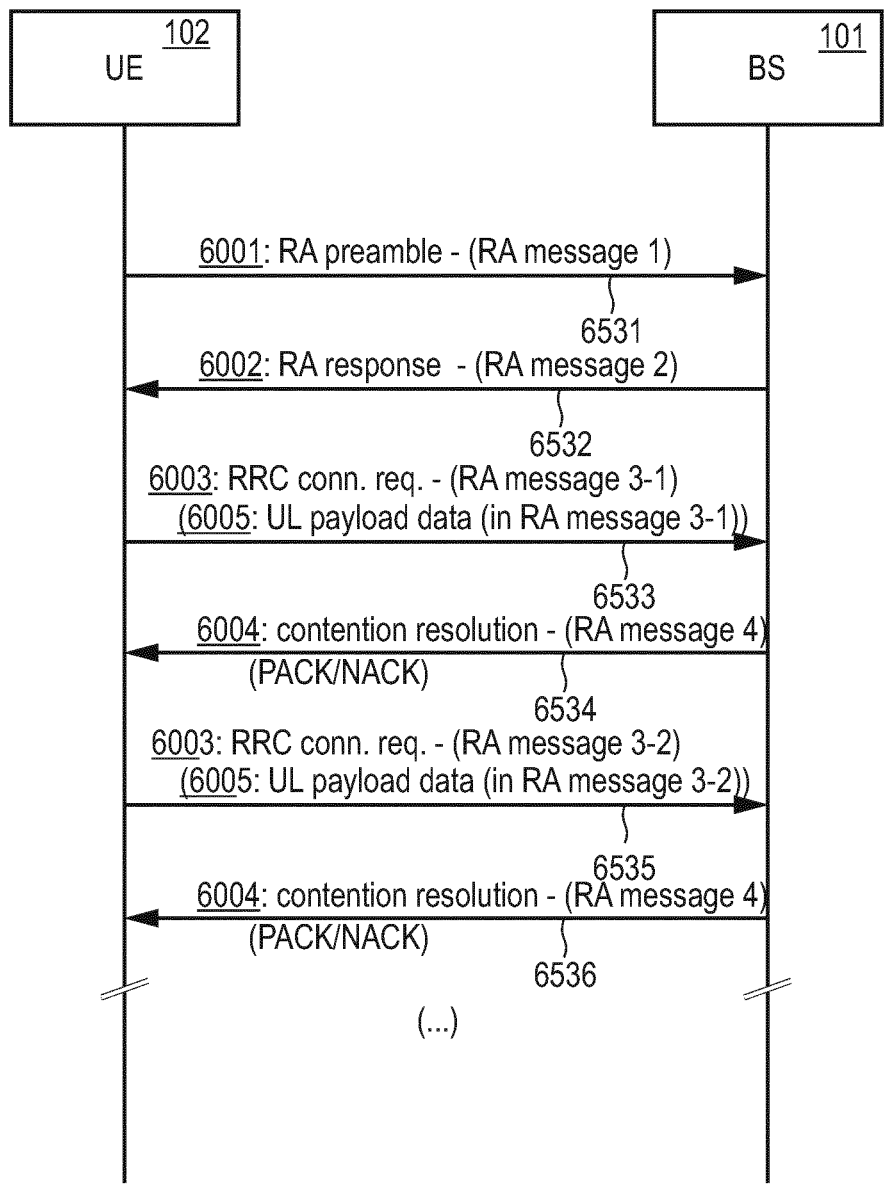
FIG. 6B is a signaling diagram of a RA procedure including EDT according to various examples.

FIG. 6B schematically illustrates aspects with respect to a RA procedure according to various examples. FIG. 6B schematically illustrates aspects with respect to EDT. Specifically, FIG. 6B illustrates an example in which UL payload data is communicated in the RA procedure, in particular in multiple repetitions of an RA message 3.

The scenario of FIG. 6B generally corresponds to the scenario of FIG. 6A. In the scenario of FIG. 6B, multiple repetitions of RA message 3 6003 and RA message 4 6004 are communicated in a time-interleaved manner, at 6533-6536.

6531 corresponds to 6521. 6532 corresponds to 6522.

Specifically, as explained above, in the scenario of FIG. 6B, an indicator is included in each repetition of the RA message 3 6003, at 6533 and 6535. The indicator included in the repetition of the RA message 3 6003 at 6533 is indicative of a need for a further repetition of the RA message 3 6003 at 6535. This indicator is positively acknowledged by the BS 101 using the RA message 4 communicated at 6534.

In detail, the response from the BS 101 indicating whether the request for an additional repetition of RA message 3 6003 is granted or not can be included in an acknowledge indicator in a RA message 4 6004 transmitted subsequent to the respective RA message 3 6003 transmission. A positive acknowledgement (PACK) or a negative acknowledgement (NACK) is conceivable. Provided that a continuation of RA message 3 transmissions is granted, the acknowledge response to the remaining repetition(s) of RA message 3 6003 can be transmitted in a combined single acknowledge message, for example RA message 4 6004.

In FIGS. 5, 6A and 6B, after transmission of the UL payload data, the UE 102 may return to an idle mode, for example RRC_IDLE. If the request is not granted, the UE 102 needs to set up a full connection to transmit the payload data.

Other options are possible, for example the request and grant could indicate a number of requested and granted RA message 3 transmissions.

FIG. 7A schematically illustrates aspects with respect to a RA procedure according to various examples. FIG. 7A schematically illustrates aspects with respect to EDT. Specifically, FIG. 7A illustrates an example in which UL payload data is communicated in the RA procedure. FIG. 7A also illustrates an example in which DL payload data is communicated in the RA procedure.

6541-6544 generally correspond to 6511-6514.

FIG. 7A illustrates an example in which the UE 102 may request a delayed RA message 4 6004 transmission. This may be, e.g., in order to support a network server response within the same RA procedure without having to set up the data connection 160. This may require to account for a RTT between the UE 102 and a destination of the UL payload data, e.g., a server of a data network access via the AP 121 (cf. FIG. 3). This may be achieved by means of an indicator included in the RA message 1 6001 and/or the RA message 3 6003.

The UE 102 may indicate in RA message 1 6001 and/or RA message 3 6003 a request for a delayed RA message 4 6004 transmission. The time delay 6100 until the RA message 4 is transmitted could be predetermined, either as a fixed value or preconfigured within an earlier RRC configuration. For example, a preconfigured delay may be in the range of 200 ms to a few seconds, for example 5 seconds. In another example, a plurality of different RA message 4 delay values may be available and the UE 102 may request one of these available values using the indicator in the RA message 1 and/or RA message 3 6003. In the various scenarios, the time delay 6100 may be defined as a number of frames or hyper-frames for an LTE system. As an alternative or option, the UE 102 may indicate in RA message 3 the request for delayed RA message 4 transmission.

As indicated in FIG. 7A, in response to requesting a delayed RA message 4 transmission, the time delay 6100 is implemented between the RA message 3 transmission at 6543 and the RA message 4 transmission at 6544. In particular, UE 102 does not abort the RA procedure until delay 6100 has expired. Likewise, BS 101 may wait until delay 6100 has expired before transmitting RA message 4. This may involve buffering DL payload data at the BS 101.

Further, the RA message 4 6004 transmission at 6504 may include not only the contention resolution information 6004, but also DL payload data 6008. The DL payload data 6008 may be provided by an application or a server to which the UL payload data 6005 of the RA message 3 was directed. Thus, a response to the UL payload data from the application or server may be communicated in the DL payload data to the UE 102. The delay 6100 may be selected large enough to cover a RTT of the payload transmission in the RA message 3 transmission to BS 101 and further to the application, the processing of the payload in the application, and the transmission from the application via the BS 101 to the UE 102 in the RA message 4 transmission.

During the delay 6100, the UE 102 may enter a low power dormant state to reduce energy consumption of UE 102. For example, the analog front end and/or the digital front end of the interface 1012 may be transitioned to a dormant state. A receiver chain may be powered down.

While FIG. 7A illustrates a scenario in which a single repetition of the RA message 3 is communicated at 6543, in other examples, it would be possible to communicate a plurality of repetitions of the RA message 3 6003, e.g., as described above in connection with FIG. 6A. In such a scenario, the RA message 4 6004 may be transmitted not before the last repetition of the RA message 3 6003 and the delay may be with respect to the last repetition of the RA message 3 6003.

Thus, the UE 102 does not have to specifically request the delay of the RA message 4 6004 transmission. Instead, UE 102 may control the delay by means of the multiple repetitions of RA message 3 6003.

Figure 7B:
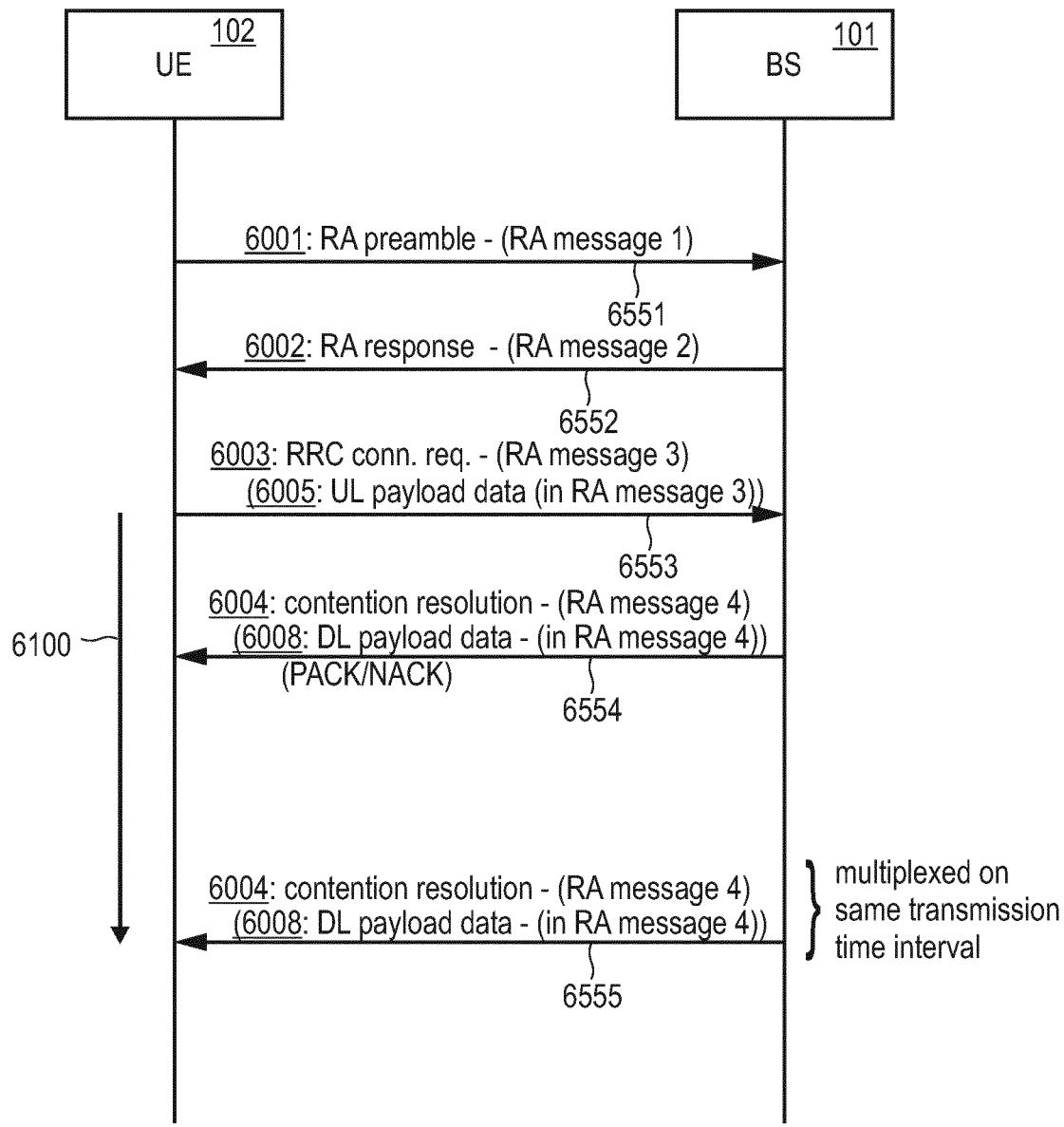
FIG. 7B is a signaling diagram of a RA procedure including EDT according to various examples.

FIG. 7B schematically illustrates aspects with respect to a RA procedure according to various examples. FIG. 7B schematically illustrates aspects with respect to EDT. Specifically, FIG. 7B illustrates an example in which UL payload data is communicated in the RA procedure. FIG. 7B also illustrates an example in which DL payload data is communicated in the RA procedure.

6551-6553 generally correspond to 6541-6543.

Then, at 6554, a first RA message 4 6004 is communicated without implementing the delay 6100. There may be no DL payload data included in the RA message 4 6003 communicated at 6554. Rather, the RA message 4 6003 communicated at 6554 may be for acknowledging the RA message 3 6003 communicated at 6553.

After the delay 6100, a second RA message 4 6004 with DL payload data 6008 included is transmitted, at 6555.

As indicated above, UE 102 may request the delay for the RA message 4 6004 in a RA message 3 6003; the requested delay 6100 may then be granted using a PACK in the first RA message 4 6004 at 6554 without including any DL payload data at 6554. In this case, the second RA message 4 6004 at 6555 including the DL payload data is delayed, e.g., to accommodate for the RTT for the DL payload data 6008.

Figure 8:
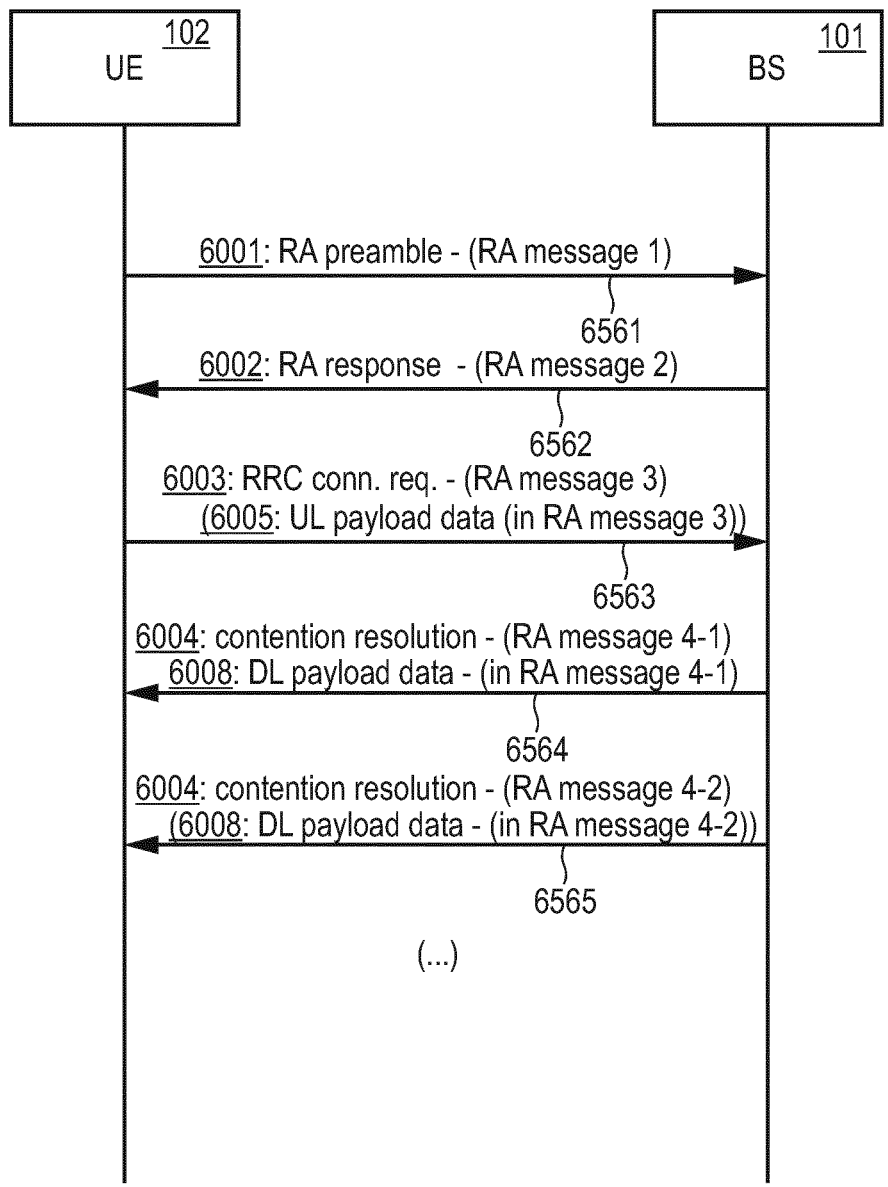
FIG. 8 is a signaling diagram of a RA procedure including EDT according to various examples.

FIG. 8 schematically illustrates aspects with respect to a RA procedure according to various examples. FIG. 8 schematically illustrates aspects with respect to EDT. Specifically, FIG. 8 illustrates an example in which UL payload data is communicated in the RA procedure. FIG. 8 also illustrates an example in which DL payload data is communicated in the RA procedure.

In connection with FIG. 8, a further example for transmitting payload data in the RA procedure is illustrated. In this example, a plurality of repetitions of the RA message 4 6004, each repetition including DL payload data 6008, are communicated from the BS 101 to the UE 102. Different repetitions may include DL payload data 6008 corresponding to a different section of an upper layer packet. Thus, the amount of DL payload data 6008 may be increased.

In detail, as described in connection with FIG. 5, RA message 1 6001 at 6561, RA message 2 6002 at 6562 and RA message 3 6003 at 6563 including UL payload data are communicated between the UE 102 and the BS 101.

At 6564, RA message 4 6004 is communicated from the BS 101 to UE 102. The RA message 4 6004 provides for contention resolution and includes DL payload data 6008.

At 6565, a further repetition of the RA message 4 6004 including the DL payload data 6008—e.g., corresponding to a different section of a higher-layer packet—is sent from the BS 101 to UE 102. Further repetitions of RA message 4 6004 including further DL payload data may follow. For example, each repetition of the RA message 4 6004 may include an indicator indicative of whether a further repetition of the RA message 4 6004 will follow or if this is the last repetition. Thus, an incremental indicator may be implemented. In another example, the first repetition of the RA message 4 6004 may include an indicator indicative of the number of repetitions of the RA message 4 6004 which will follow. According to yet another example, the RA message 2 6002 may already include an indicator indicative of the number of repetitions of the RA message 4 6004 which will follow. Instead of indicating the number of repetitions of RA message 4 6004, a size of DL payload data, for example in terms of data symbols or bytes, may be indicated in the RA message 2 6002 and/or one or more repetitions of the RA message 4 6004.

Figure 9:
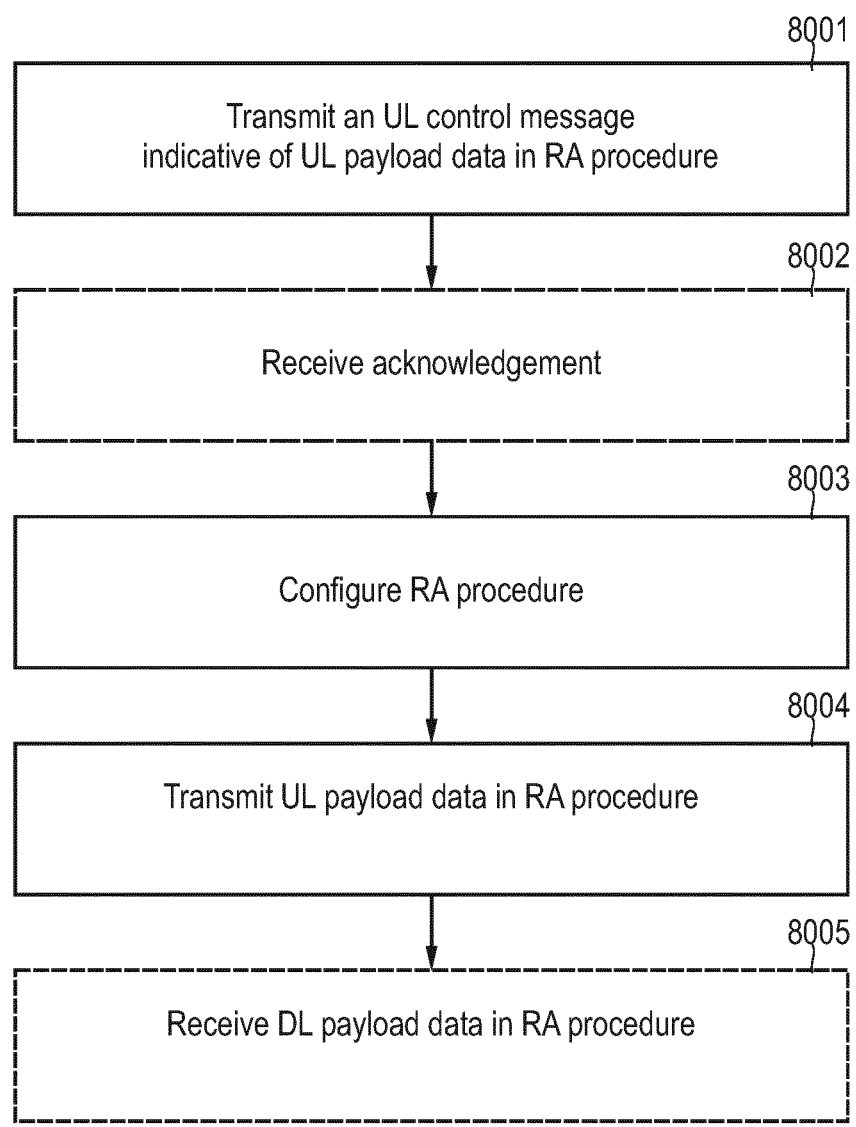
FIG. 9 is a flowchart of a method according to various examples.

FIG. 9 shows a method related to an RA procedure. The method of FIG. 9 may be executed by the UE 102, in particular in the CPU 1021 of UE 102 as shown in FIG. 2. The processing may be based on program code stored in the memory 1025 and executed by the CPU 1021.

In step 8001 the UE 102 may transmit, to BS 101, and UL control message of the RA procedure. The UL control message includes an indicator indicative of UL payload data queued for transmission during the RA procedure.

In step 8002, UE 102 receives an acknowledgement from the BS 101, which grants the transmission of UL payload data during the RA procedure. Step 8002 is optional. For example, in some scenarios, the UE 102 may assume that the request is always granted.

In step 8003 the UE 102 configures the RA procedure depending on the indicator and optionally the grant from the BS 101. The indicator may indicate for example the size of UL payload data to be transmitted during the RA procedure or the number of repetitions of RA message 3 required for transmitting the UL payload data. Configuring the RA procedure may include, e.g., providing the UL payload data in corresponding portions for the transmission in the RA message 3 transmissions.

In step 8004 the UL payload data is transmitted in the RA procedure configured in accordance with the indicator. For example the UL payload data is transmitted in a plurality of RA message 3 transmissions.

In step 8005 the UE 102 may receive from the BS 101 DL payload data, for example in one or more repetitions of RA message 4 of the RA procedure. Step 8005 is optional.

FIG. 10 shows a method related to an RA procedure. For example, the method of FIG. 10 may be executed by the BS 101. In particular, the processing may be performed in CPU 1011 of BS 101. Program code for processing the RA procedure may be stored in memory 1015 and executed by the CPU 1011.

In step 9001 the BS 101 receives from UE 102 an UL control message of the RA procedure. The UL control message includes an indicator indicative of UL payload data queued for transmission during the RA procedure. For example, the indicator may indicate the amount of UL payload data to be transmitted during the RA procedure or a number of RA message 3 transmissions required for transmitting the UL payload data.

In step 9002 the BS 101 may transmit an acknowledgement to UE 102 indicating a grant to transmit UL payload data in the RA procedure. The acknowledgement may be transmitted for example in an RA message 2 transmission. Step 9002 is optional.

Depending on the indicator, BS 101 configures the RA procedure in step 9003, and receives UL payload data in the RA procedure configured in accordance with the indicator in step 9004. For example, BS 101 may receive a plurality of repetitions of the RA message 3, each repetition including a part of the UL payload data from UE 102. BS 101 may forward the received UL payload data to an application or a server and may receive from the application or the server DL payload data in response.

In step 9005 BS 101 may transmit the DL payload data within the RA procedure to the UE 102. For example, the DL payload data may be included in one or more RA message 4 transmissions.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For example, an RA procedure may include multiple RA message 3 transmissions including UL payload data as described in connection with FIG. 6A, combined with the delayed RA message 4 transmission as described in connection with FIG. 7A, and further combined with multiple RA message 4 transmissions including DL payload data is described in connection with FIG. 8.

As payload data in UL and DL directions may be communicated already in the RA procedure in the examples described above, a further connection establishment of the user plane communication between the UE 102 and the BS 101 may not be needed such that the UE 102 may return into an energy-saving idle state, for example RRC_IDLE, after reception of the final RA message 4. However, in case BS 101 does not grant the transmission of UL payload data in the RA procedure as requested by UE 102, the RA procedure may either be aborted or conventionally conducted followed by a user plane communication establishment between the UE 102 and BS 101.

The invention claimed is:

1. A method, comprising:
communicating, between a terminal and a base station, an uplink control message of a random access procedure, the uplink control message comprising an indicator indicative of uplink payload data queued for transmission during the random access procedure,
configuring the random access procedure depending on the indicator, and
communicating, in the random access procedure configured in accordance with the indicator, the uplink payload data,
wherein said configuring comprises:
setting a count of repetitions of a Layer 3 connection request message of the random access procedure depending on the indicator.

2. The method of claim 1,
wherein the uplink control message is a random access message of the random access procedure which includes a random access preamble of the terminal.

3. The method of claim 2,
wherein the random access preamble implements the indicator.

4. The method of claim 3,
wherein a predefined subset of one or more random access preambles from a pool of predefined random access preambles is used to implement the indicator.

5. The method of claim 2,
wherein the random access message includes the random access preamble and the indicator as separate information fields.

6. The method of claim 1,
wherein the uplink control message is a Layer 3 connection request message of the random access procedure.

7. The method of claim 1,
wherein the indicator is indicative of a size of the uplink payload data.

8. The method of claim 1, further comprising:
communicating multiple repetitions of a Layer 3 connection request message of the random access procedure in accordance with the indicator.

9. The method of claim 1, further comprising:
communicating multiple repetitions of a Layer 3 connection response message of the random access procedure in accordance with the indicator.

10. The method of claim 8,
wherein the multiple repetitions of the Layer 3 connection request message and the multiple repetitions of the Layer 3 connection response message are communicated interleaved in time domain.

11. The method of claim 1, further comprising:
communicating a first Layer 3 connection response message of the random access procedure, the first Layer 3 connection response message including a further indicator indicative of a count of at least one second Layer 3 connection response message of the random access procedure, and
communicating the at least one second Layer 3 connection response message in accordance with the further indicator.

12. The method of claim 1,
wherein said configuring comprises:
setting a delay of a Layer 3 connection response message of the random access procedure with respect to a Layer 3 connection request message of the random access procedure depending on the indicator.

13. The method of claim 12,
wherein the delay is not smaller than 200 ms.

14. The method of claim 12,
wherein the Layer 3 connection response message includes a round-trip time indicator indicative of a round-trip time of transmissions between the base station and a destination of the uplink payload data.

15. The method of claim 1, further comprising:
communicating a Layer 3 connection response message of the random access procedure, the Layer 3 connection response message including downlink payload data from a destination to which the uplink payload data is directed.

16. The method of claim 1,
wherein the uplink payload data is included in a Layer 3 connection request message of the random access procedure.

17. The method of claim 16, further comprising:
communicating a Layer 3 connection response message of the random access procedure, the Layer 3 connection response message including a positive or negative acknowledgement of reception of the uplink payload data.

18. A terminal device comprising control circuitry configured to perform:
transmitting, to a base station of a wireless network, an uplink control message of a random access procedure, the uplink control message comprising an indicator indicative of uplink payload data queued for transmission during the random access procedure,
configuring the random access procedure depending on the indicator, and
transmitting, in the random access procedure configured in accordance with the indicator, the uplink payload data,
wherein said configuring comprises:
setting a count of repetitions of a Layer 3 connection request message of the random access procedure depending on the indicator.

19. A base station comprising control circuitry configured to perform:
receiving, from a terminal device, an uplink control message of a random access procedure, the uplink control message comprising an indicator indicative of uplink payload data queued for transmission during the random access procedure,
configuring the random access procedure depending on the indicator, and
receiving, in the random access procedure configured in accordance with the indicator, the uplink payload data,
wherein said configuring comprises:
setting a count of repetitions of a Layer 3 connection request message of the random access procedure depending on the indicator.

* * * * *